United States Patent [19]

Kreyenborg

[11] Patent Number: 5,125,823
[45] Date of Patent: Jun. 30, 1992

[54] APPARATUS FOR FILTERING PLASTICIZED MATERIALS

[75] Inventor: Udo Kreyenborg, Münster-Kinderhaus, Fed. Rep. of Germany

[73] Assignee: Kreyenborg Verwaltungen und Beteiligungen KG, Münster, Fed. Rep. of Germany

[21] Appl. No.: 645,545

[22] Filed: Jan. 24, 1991

[30] Foreign Application Priority Data

Apr. 19, 1990 [DE] Fed. Rep. of Germany ....... 4012404

[51] Int. Cl.$^5$ ...................... B29C 47/34; B01D 33/35
[52] U.S. Cl. .................................... 425/185; 210/108; 210/236; 210/333.01; 425/190; 425/198; 425/199
[58] Field of Search ............... 425/197, 198, 199, 185, 425/186, 190; 210/108, 234, 236, 333.1, 333.01

[56] References Cited

U.S. PATENT DOCUMENTS

| | | | |
|---|---|---|---|
| 4,597,870 | 7/1986 | Lambertus | 425/199 |
| 4,701,118 | 10/1987 | Köching | 425/185 |
| 4,725,215 | 2/1988 | Kreyenborg | 425/185 |
| 4,752,386 | 6/1988 | Schulz et al. | 425/199 |
| 5,004,414 | 4/1991 | Studo et al. | 425/185 |
| 5,032,267 | 7/1991 | Petschner | 425/199 |

FOREIGN PATENT DOCUMENTS 1097660  1/1961  Fed. Rep. of Germany .
2119545  10/1972  Fed. Rep. of Germany .

Primary Examiner—Jay H. Woo
Assistant Examiner—Khanh P. Nguyen
Attorney, Agent, or Firm—Peter K. Kontler

[57] ABSTRACT

Apparatus for filtering plasticized material between two discrete inlets and a main outlet of a housing has two passages each of which connects one of the inlets with the main outlet. Each passage receives a reciprocable cylindrical filter carrier which can establish or interrupt a path for the flow of plasticized material from the respective inlet to the main outlet, depending on the selected axial position of the carrier. In order to expel contaminants which gather at the upstream side of the filter in a carrier, the carrier which is to be relieved of contaminants is moved to an axial position in which the respective inlet is sealed and the space at the downstream side of the filter receives filtered plasticized material substantially centrally of the filter. Contaminants are expelled from the space at the upstream side of the filter by way of a second outlet which is provided in the housing and communicates with the filter chamber of the carrier which is in the process of being relieved of contaminants. The space at the downstream side of the filter of each carrier is adjacent the inlets of two discrete channels or the inlet of a twin channel which delivers filtered material to one or more channels in the housing to convey filtered material to the main outlet.

10 Claims, 7 Drawing Sheets

APPARATUS FOR FILTERING PLASTICIZED MATERIALS

CROSS-REFERENCE TO RELATED CASE

The apparatus of the present invention constitutes an improvement over and a further development of the apparatus which is disclosed in commonly owned copending patent application Ser. No. 07/446,557 filed Dec. 5, 1989 for "Apparatus for filtering plasticized materials in extruders and like machines", now U.S. Pat. No. 5,004,414 granted Apr. 2, 1991.

BACKGROUND OF THE INVENTION

The invention relates to improvements in apparatus for filtering plasticized materials in extruding, injection molding and like machines.

Commonly owned copending patent application Ser. No 07/446,557 of Stude et al. now U.S. Pat. No. 5,004,414 discloses a filtering apparatus wherein a housing has an inlet, an outlet and two passages each of which extends between the inlet and the outlet and receives a cylindrical filter carrier mounted for reciprocatory movement between first and second positions. When in their first positions, the carriers permit plasticized material to flow from the inlet, through filters in their filter chambers, and thence into the outlet of the housing. If one of the carriers is moved to the second position while the other carrier remains in the first position, plasticized material which has been cleaned by passing through the filter of the other carrier is diverted in part into channels leading to the filter chamber of the one carrier, and the diverted material flows counter to the normal direction of flow of plasticized material through the chamber of the one carrier to entrain intercepted impurities by way of a channel which is provided in the housing and is sealed from the chamber of the one carrier when the latter is maintained in the first position. An advantage of the filtering apparatus of Stude et al. is that the channels which serve to establish paths for the flow of filtered plasticized material counter to the normal direction of flow (toward the outlet of the housing) are always filled with flowing plasticized material when the respective filter carriers are maintained in their first positions. This is desirable and advantageous because accumulations of stagnant plastic material in the housing and/or in the filter carriers would be likely to harden and to prevent any, or to prevent predictable, flushing of impurities from the chambers of the filter carriers. The arrangement is such that, when one of the filter carriers is moved to the second position, filtered plastic material which has passed through the chamber of the other filter carrier (while the other filter carrier is maintained in the first position) flows into the chamber of the one carrier at the downstream (clean) side of the respective filter and adjacent a marginal portion of the filter to leave the chamber at the other (contaminated) side of the filter adjacent another marginal portion of the filter. Such mode of establishing a path for the flow of filtered plastic material through the chamber of the filter carrier in the second position cannot invariably ensure the expulsion of all impurities from the chambers of filter carriers and out of the housing of the filtering apparatus.

Other types of filtering apparatus are disclosed in commonly owned U.S. Pats. Nos. 4,701,118 (granted Oct. 20, 1987) to Köching et al.) and 4,725,215 (granted Feb. 16, 1988 to Kreyenborg et al.). The patent to Köching et al. discloses an apparatus wherein each reciprocable carrier supports two filters one of which is accessible when the other is in use and vice versa. The patent to Kreyenborg et al. discloses an apparatus with an exchangeable cylindrical filter holder which is reciprocable in a housing and contains a substantially plate-like filter disposed suhstantially diametrically of the holder.

German Auslegeschrift No. 1 097 660 of Corbett discloses an apparatus wherein a cylindrical filter is mounted for angular movement in a housing which is provided with an inlet for unfiltered plastic material and an outlet for filtered plastic material.

German Auslegeschrift No. 2 111 545 of Lambertus discloses an apparatus wherein a plate-like carrier supports several axially parallel filters. The carrier is movable between a plurality of positions in each of which a different set of filters can receive plasticized material from an extruder.

OBJECTS OF THE INVENTION

An object of the invention is to provide a filtering apparatus which even more reliably ensures the evacuation of contaminants from the filtering chambers of filter carriers than the apparatus which is described, claimed and shown in the copending patent application of Stude et al.

Another object of the invention is to provide an apparatus wherein the locus of admission of filtered plastic material at the clean side of the filter in the filter chamber of a filter carrier can be selected practically at will and in such a way that the filtered plastic material is more likely to expel all impurities from the contaminated side of the filter-receiving chamber.

A further object of the invention is to provide a novel and improved housing for use in the above outlined apparatus.

An additional object of the invention is to provide novel and improved filter carriers for use in the above outlined filtering apparatus.

Still another object of the invention is to provide an apparatus wherein the filtered plastic material which is used to flush out impurities from the dirty side of the filter in the chamber of a filter carrier can be directed toward the central portion of the clean side of the filter.

Another object of the invention is to provide a novel and improved method of expelling impurities from the chambers of filter carriers in the above outlined apparatus.

SUMMARY OF THE INVENTION

The improved apparatus is utilized as a means for filtering a flowable plastic material, e.g., in an extruder or a like machine, and comprises a housing having at least one inlet and at least one outlet for the plastic material and first and second passages which extend between the at least one inlet and the at least one outlet. The apparatus further comprises first and second carriers which are mounted in the first and second passages, respectively, and are movable relative to the housing between first and second positions. Each carrier has a chamber and filter means provided in the chamber to filter the plastic material. Each chamber communicates with the at least one inlet and with the at least one outlet in the first position of the respective carrier so that a stream of plastic material can flow from the at least one inlet, through the filter means in a first direction and into the at least one outlet. Still further, the apparatus comprises means for flushing plastic material out of the chambers and out of the respective carriers, and such flushing means includes means for establishing paths along which plastic material can flow through the filter means in a second direction counter to the first direction in the second positions of the carriers. Each passage comprises a hole or bore for the respective carrier and a first channel connecting the hole with the at least one outlet. Each carrier is further provided with a second channel which connects the respective chamber with the respective first channel in the first position of the respective carrier, and the flushing means comprises a third channel which is provided in the housing between the hole and the first channel of each passage and a fourth channel which is provided in each carrier to communicate with the respective chamber. The third channels communicate with the second channels in the second positions of the respective carriers, and the fourth channels communicate with the respective first channels in the first positions and are sealed from the respective first channels in the second positions of the respective carriers.

The housing is provided with at least one second outlet which communicates with the chambers in the second positions of the respective carriers. The carriers can be provided with third outlets (e.g., in the form of slots) which communicate with the at least one second outlet in the second positions of the respective carriers. The filters are disposed between the respective third outlets and the respective second channels.

The first channels are or can be communicatively connected with each other so that filtered plastic material which flows in one of the first channels toward the at least one outlet in the first position of one of the carriers can flow into the other first channel in the second position of the other carrier and vice versa.

Each third channel can form an integral part of the respective first channel, and each fourth channel can form an integral part of the respective second channel.

The filter means are disposed between the at least one inlet and the respective second and fourth channels in the first positions of the respective carriers.

At least one of the carriers can constitute a reciprocable cylinder which is snugly received in the respective hole or bore of the housing. The respective chamber, the respective second channel and the respective fourth channel can extend substantially or exactly radially of the cylinder.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
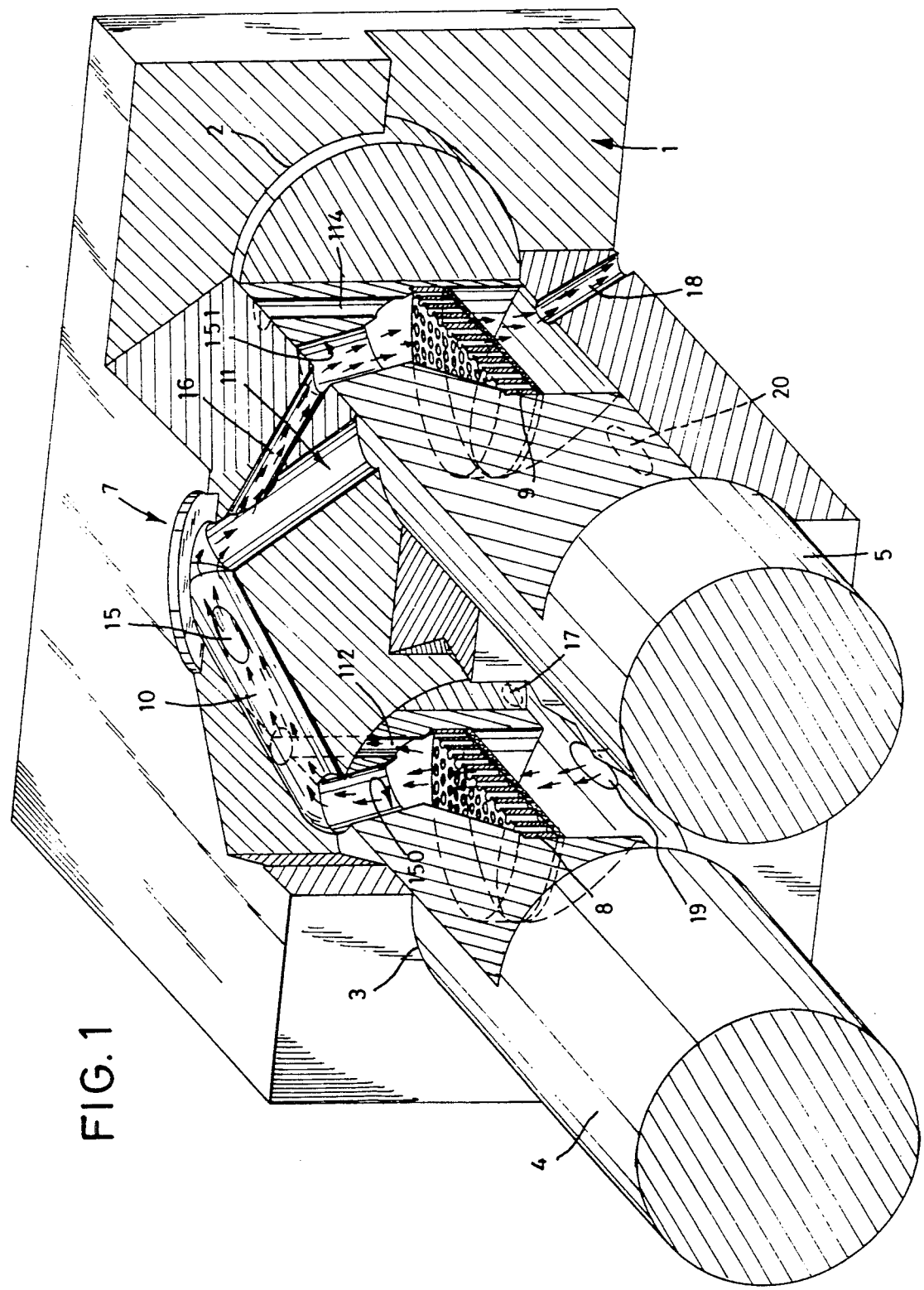
FIG. 1 is a fragmentary perspective view of a filtering apparatus which embodies one form of the invention, with the housing and the filter carriers partly broken away, one of the carriers being shown in a first or operative position and the other carrier being shown in a second position for flushing of contaminants out of its filtering chamber.
Figure 3:
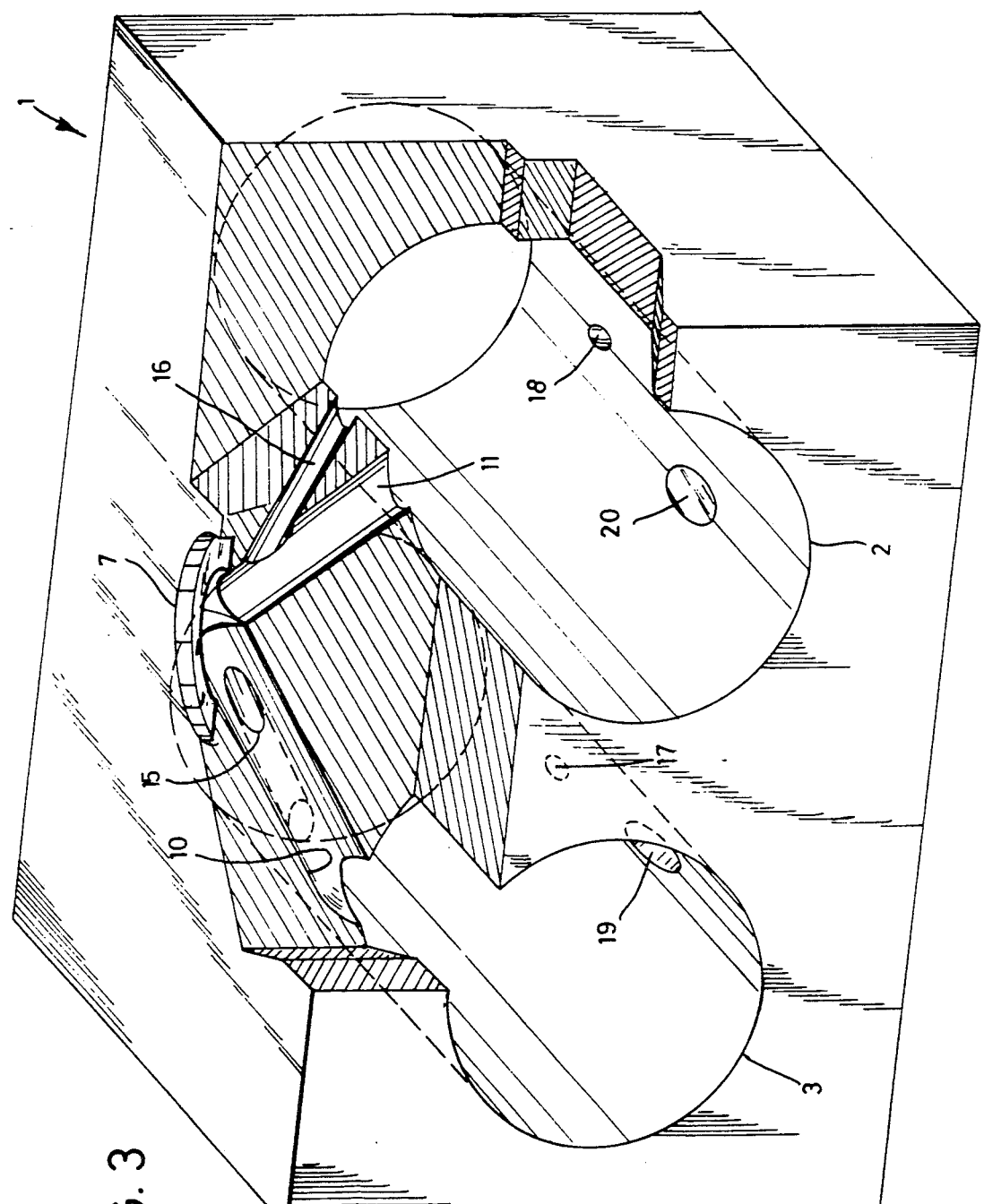
FIG. 3 shows the housing in the view of FIG. 1 but with the filter carriers removed.

The filtering apparatus which is shown in FIG. 1 comprises a housing 1 (see also FIG. 3) which has two discrete inlets 19, 20 for unfiltered plasticized material, an outlet 7 for filtered material, and first and second passages each of which extends between one of the inlets 19, 20 and the outlet 7. The first passage includes a hole or bore 3 which communicates with the inlet 19, and a first or main channel 10 which extends between the hole 3 and the outlet 7. The second passage includes a hole or bore 2 which communicates with the inlet 20, and a first or main channel 11 which connects the hole 2 with the outlet 7. The passage 3 snugly but reciprocably receives a first elongated cylindrical filter carrier 4, and a similar second elongated cylindrical filter carrier 5 is reciprocably received in the hole 2 of the housing 1. The filter carriers 4 and 5 are or can be identical.

Figure 2:
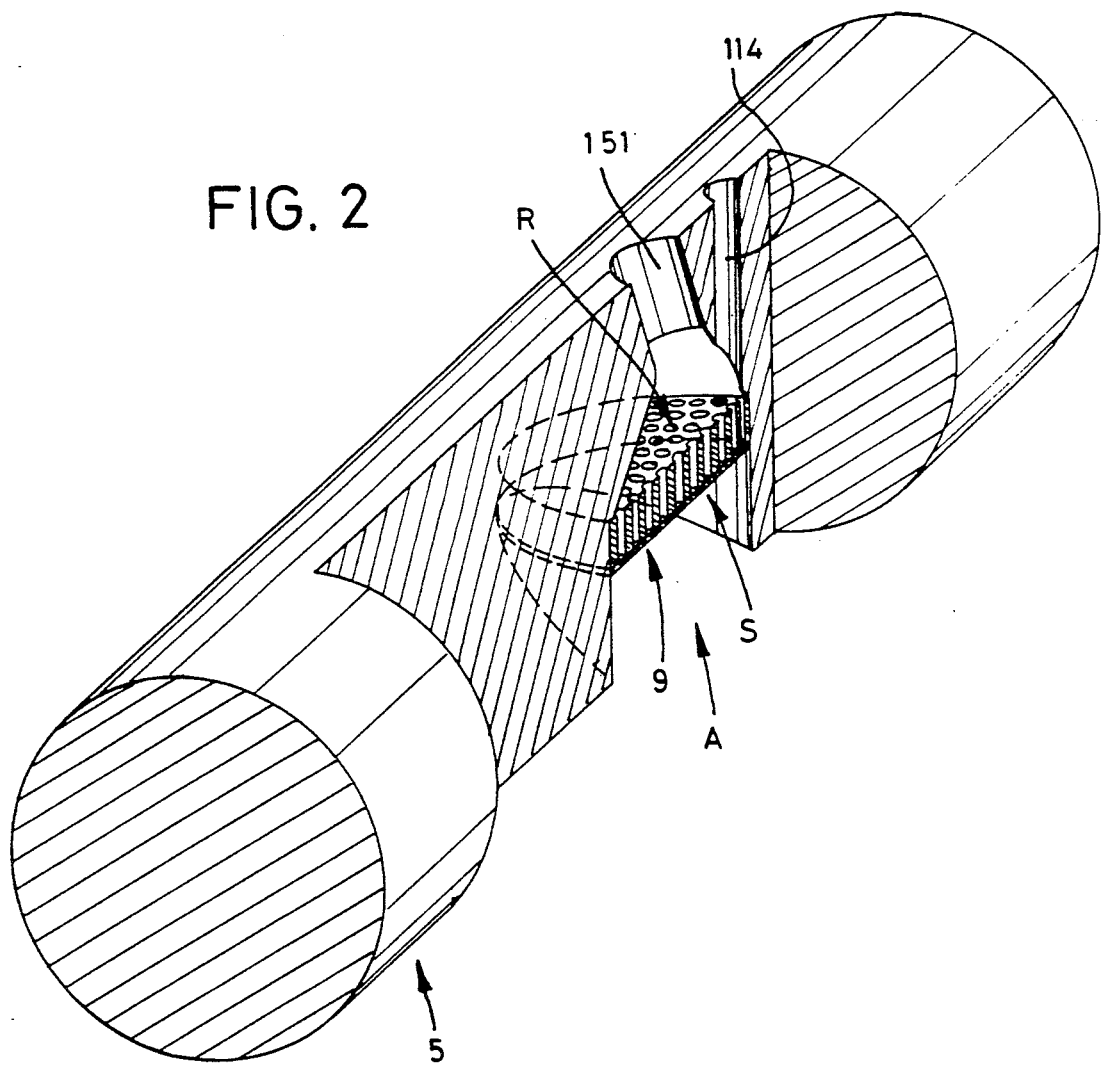
FIG. 2 is a fragmentary perspective view of one of the filter carriers, with a portion broken away.

FIG. 2 shows that the carrier 5 comprises a filter chamber A which communicates with the inlet 20 and with the outlet 7 when the carrier 5 assumes a first position (corresponding to the position of the filter carrier 4 in FIG. 1). The chamber A of the carrier 5 is sealed from the inlet 20 and outlet 7 but communicates with a second outlet 18 of the housing 1 when this carrier 5 assumes a second position (shown in FIG. 1). Analogously, the chamber A of the filter carrier 4 communicates with the inlet 19 and with the outlet 7 when this carrier assumes the first position which is shown in FIG. 1, but the chamber A of the carrier 4 is sealed from the inlet 19 and outlet 7 in the second position of this carrier (corresponding to the position of the carrier 5 in FIG. 1); the chamber A of the carrier 4 then communicates with a second outlet 17 of the housing 1.

The chamber A of the carrier 4 contains a filter 8, and the chamber A of the carrier 5 contains a filter 9. Each filter comprises a perforated supported plate and a sieve at one side of the supporting plate. The inlets 19, 20 can constitute branches of a single inlet which receives plasticized material from a suitable source, not shown.

When the carrier 4 assumes the first position of FIG. 1, plasticized material which is admitted into the respective chamber A by way of the inlet 19 is caused to pass through the filter 8 and thence through a connecting channel or second channel 150 (provided in the carrier 4) into the first channel 10 which conveys filtered material to the outlet 7. Analogously, when the carrier 5 is held in the first position (corresponding to that of the carrier 4 in FIG. 1), plasticized material which is admitted by the inlet 20 flows through the filter 9 in the chamber A of the carrier 5 and thereupon through a second channel 151 (provided in the carrier 5) on its way into the first channel 11 which conveys filtered material to the outlet 7.

The discharge ends of the first channels 10, 11 can be sealed from the outlet 7 in response to shifting of the respective carriers 4, 5 to third positions in which their chambers A are accessible for convenient inspection, cleaning or replacement of the respective filters 8 and 9.

FIG. 2 shows that the chamber A of the carrier 5 has a first or downstream portion R which communicates with the second channel 151 and contains freshly filtered plasticized material when the carrier 5 assumes the first position, and a second or upstream portion S which contains unfiltered plasticized material (supplied by the inlet 20) in the first position of the carrier 5. Analogously, the chamber A of the carrier 4 also contains a first portion R which communicates with the second channel 150 and a second portion S which communicates with the inlet 19 in the first position (shown in FIG. 1) of this carrier.

The filter carrier 4 is provided with a bypass (fourth channel) 112 which communicates with the first portion of the chamber A and with the first or main channel 10 (see FIG. 1) in the first position of the carrier 4. A similar bypass (fourth channel) 114 (see particularly FIG. 2) is provided in the carrier 5 to connect the first portion R of the chamber A with the first or main channel 11 when the carrier 5 is caused to assume its first position in which the second portion S of its chamber A receives unfiltered material from the inlet 20.

The outlet end of the bypass 112 can admit filtered plasticized material into the first channel 10 (or directly into the outlet 7) by way of a third channel 15 which is provided in the housing 1. Another third channel 16 of the housing 1 serves to connect the outlet end of the bypass 114 in the carrier 5 with the first channel 11 or directly with the outlet 7.

The inlet ends of the second outlets 17, 18 are sealed from the second portions (S) of the chambers A in the first positions of the respective carriers 4 and 5. This can be seen in FIG. 1 wherein the peripheral surface of the carrier 4 (which is maintained in the first position) seals the inlet end of the second outlet 17. The illustrated second outlets 17, 18 are bores or holes which extend substantially or exactly radially of the respective filter carriers 4 and 5. The same preferably holds true for the second channels 150, 151 and the bypasses 112, 114.

The operation of the apparatus which is shown in FIG. 1 is as follows:

FIG. 1 shows the filter carrier 4 in the first or operative position. The carrier 5 is shown in the second position. Unfiltered plasticized material which is admitted by way of the first inlet 19 enters the second portion S of the chamber A in the carrier 4, and filtered plasticized material leaves the first portion R of the chamber A by way of the second channel 150 and fourth channel or bypass 112. Such filtered material is admitted into the outlet 7 by way of the first channel 10 and third channel 15. Thus, the bypass 112 does not contain any stagnant plastic material because any (filtered) material which enters this bypass by flowing from the first portion R of the chamber A in the carrier 4 is compelled to flow on toward the outlet 7, i.e., into the channels 10 and 15 to thereupon enter the outlet.

At the same time, contaminants which have gathered in the second portion S of the chamber A in the filter carrier 5 (which is assumed to be maintained in the second position shown in FIG. 1) are expelled into the second outlet 18 and out of the housing 1 in response to admission of filtered plasticized material from the first channel 10 and/or third channel 15, via third channel 16 (the outlet end of the first or main channel 11 is sealed by the peripheral surface of the carrier 5 in the second position), second channel 151 and first chamber R. The first or main channel 11 is filled with stagnant filtered plasticized material; however, this does not result in hardening of filter material which is entrapped in the first channel 11 because the channel 11 is provided in the relatively cool housing 1, i.e., in a part which is cooled than the filter carriers 4 and 5.

An important advantage of the improved apparatus is that filtered material which is caused to flow from the first portion R into the second portion S of a chamber A (see the chamber A of the carrier 5 in FIG. 1) more reliably expels gathered impurities from the second portion S than in heretofore known filtering apparatus. This is due to the fact that second channel 151 admits filtered plasticized material substantially centrally of the first portion R to thus ensure that filtered plasticized material flows through the entire filter 9 and into each zone of the second portion S in order to expel impurities into the second outlet 18 which then communicates with the second portion S of the chamber A in the carrier 5.

Another important advantage of the improved apparatus is that the filter carrier (see the carrier 4 of FIG. 1) which is maintained in the first position enables freshly filtered material to leave the first portion R of the respective chamber A along two paths (via second channel 150 and by way of the fourth channel or bypass 112).

Figure 4:
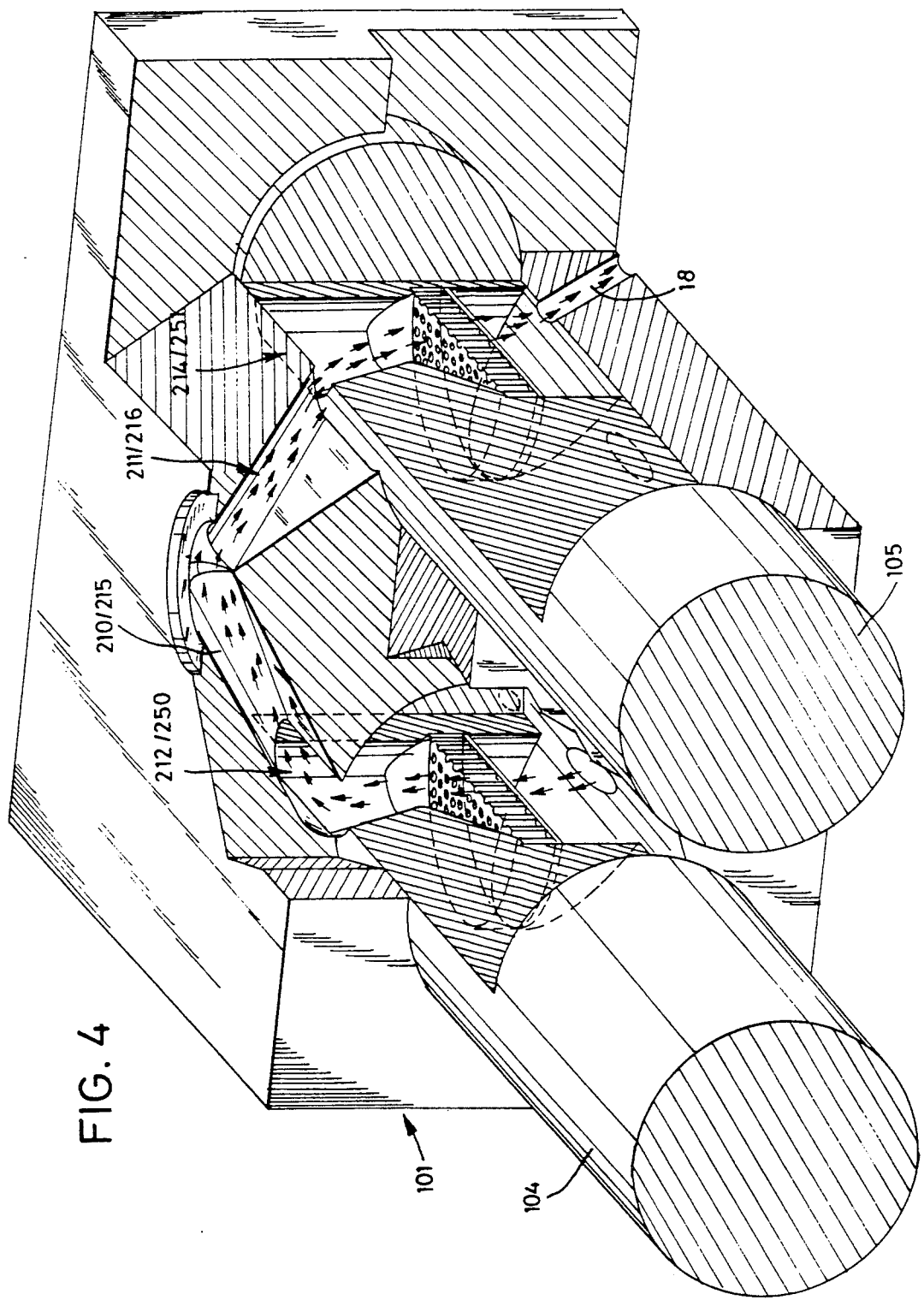
FIG. 4 is a perspective view which is similar to that of FIG. 1 but shows the housing and the filter carriers of a modified apparatus.

FIG. 4 shows that the second and fourth channels 250 and 212 of the modified housing 101 are combined into a single channel, the same as the first and third channels 210, 215, the second and fourth channels 251, 214 and the first and third channels 211, 216. This establishes larger paths for the flow of plasticized material.

Figure 5:
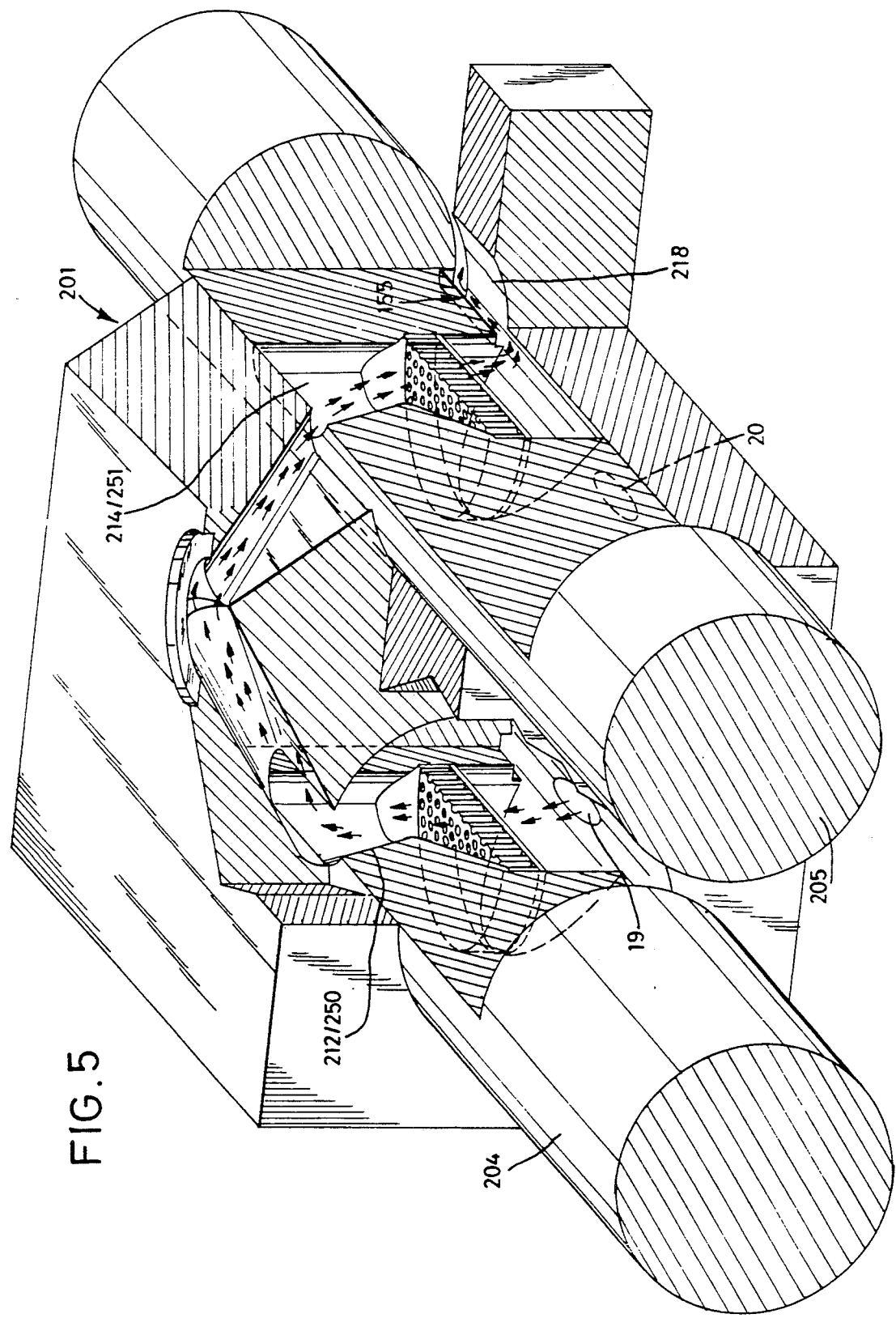
FIG. 5 is a perspective view similar to that of FIG. 1 but showing the housing and the filter carriers of a third apparatus.
Figure 6:
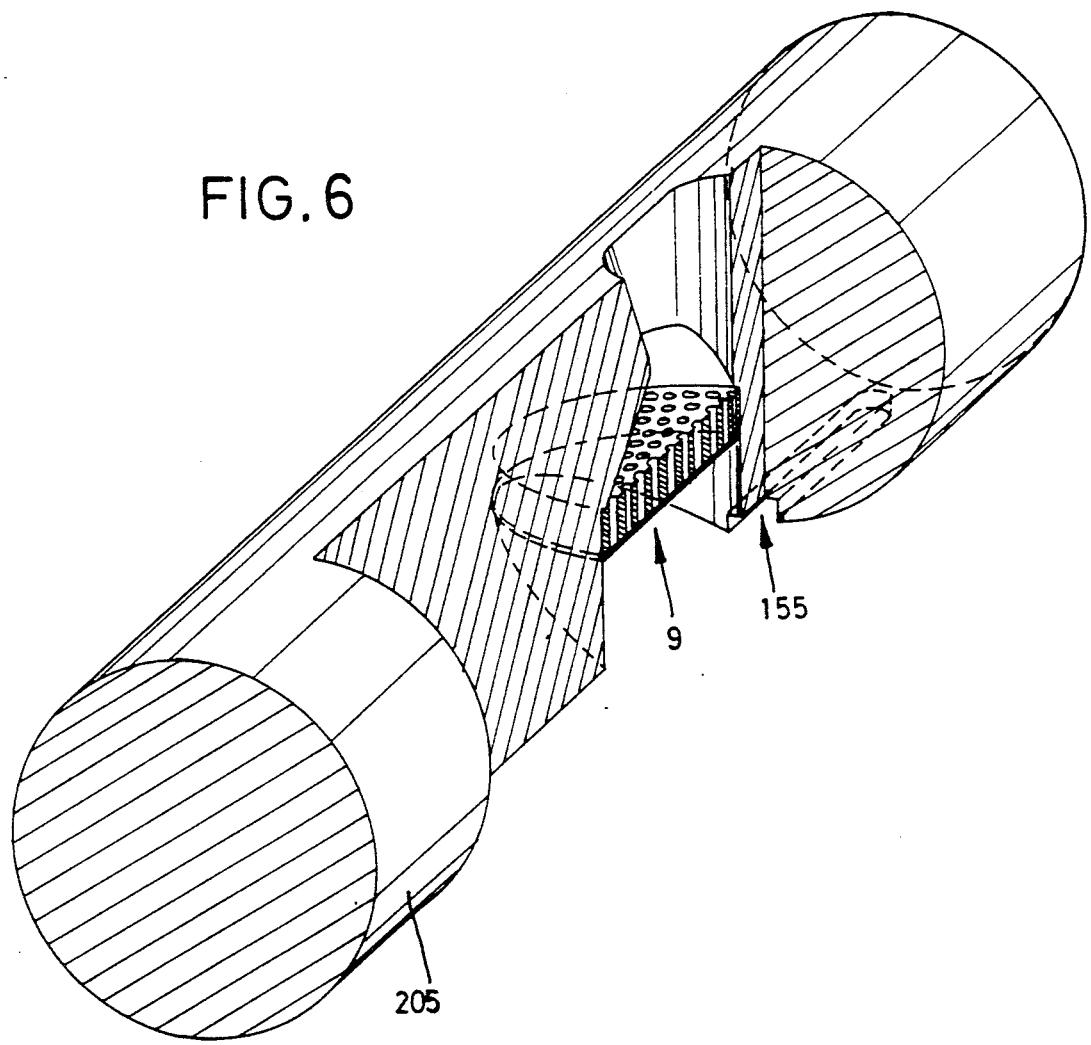
FIG. 6 is a fragmentary perspective view of one of the filter carriers in the apparatus of FIG. 5, with a portion broken away.
Figure 7:
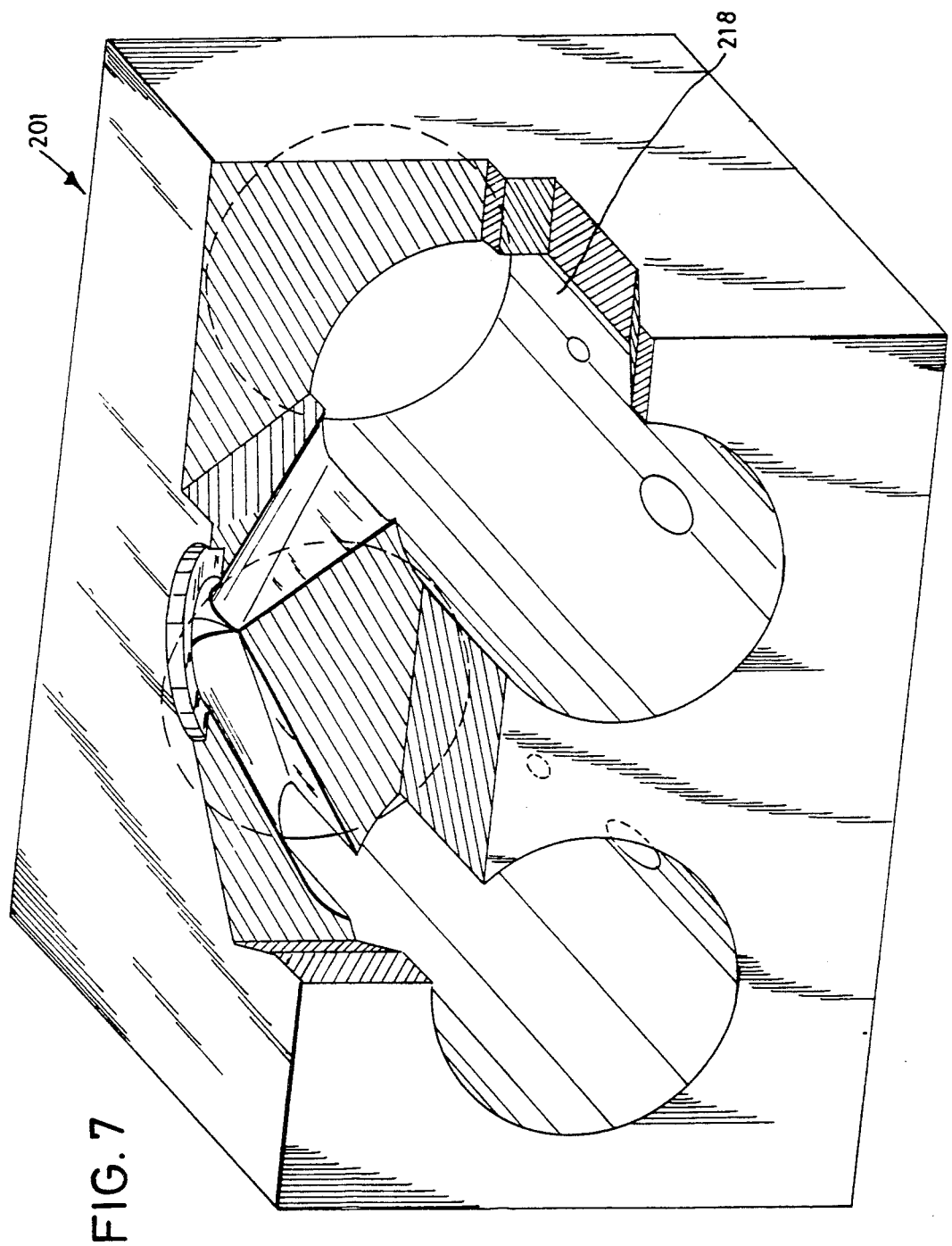
FIG. 7 shows the housing of the third apparatus in the view of FIG. 5 but with the filter carriers omitted.

FIGS. 5 to 7 shows a third embodiment wherein the second outlets 17, 18 of the housing 1 are replaced by composite outlets including a second outlet in the housing 201 (only the outlet 218 for the carrier 205 is actually shown) and a third outlet in the form of a slot in the respective carrier (FIGS. 5 and 6 show the slot 155 in the carrier 205). The filter carrier 204 is or can be identical with the carrier 205. In all other respects, the housing 201 of FIGS. 5 and 7 is or can be identical with the housing 101 of FIG. 4, i.e., the housing 201 also comprises single channel replacing the channels 212, 250 and a single channel replacing the channels 214, 251.

The apparatus of FIGS. 4 and 5 to 7 exhibit the advantage that the carriers 104, 105 or 204, 205 and the housing 101 or 201 can be machined at a lower cost. This is due to the fact that the discrete channels of the carriers 4, 5 and housing 1 are grouped into pairs of channels 210, 215; 212, 250; 211, 216 and 214, 251.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for filtering a flowable plastic material, comprising a housing having at least one inlet and at least one outlet for the plastic material and first and second passages extending between said at least one inlet and said at least one outlet; first and second filter carriers respectively mounted in said first and second passages and movable relative to said housing between first and second positions, each of said carriers having a chamber and filter means provided in the chamber for filtering the plastic material, each chamber communicating with said at least one inlet and with said at least one outlet in the first position of the respective carrier so that a stream of plastic material flows from said at least one inlet, through said filter means in a first direction and into said at least one outlet; and means for flushing plastic material out of said chambers, including means for establishing paths along which plastic material flows through said filter means in a second direction counter to said first direction in the second positions of said carriers, each of said passages comprising a hole for the respective carrier and a first channel connecting the hole with said at least one outlet, each of said carriers further having a second channel connecting a substantially centrally located portion of the respective chamber with the respective first channel in the first position of the respective carrier, said flushing means comprising a third channel provided in said housing between the hole and the first channel of each of said passages and a fourth channel provided in each of said carriers in communication with the respective chamber, said third channels communicating with the second channels in the second positions of the respective carriers to thus ensure that filtered plastic material flows through the entire filter in the respective chamber, said second and fourth channels communicatively connecting said chambers with the respective first channels in the first positions of the respective carriers and said fourth channels being sealed from the respective first channels in the second positions of the respective carriers.

2. The apparatus of claim 1, wherein said housing further comprises at least one second outlet which communicates with said chambers in the second positions of said carriers.

3. The apparatus of claim 2, wherein said first channels are communicatively connected with each other so that plastic material which flows in one of said first channels toward said at least one outlet in the first position of the respective carrier flows into the other of said first channels in the second position of the respective carrier.

4. The apparatus of claim 1, wherein each of said third channels is an integral part of the respective first channel.

5. The apparatus of claim 1, wherein each of said fourth channels is an integral part of the respective second channel.

6. The apparatus of claim 1, wherein said housing has at least one second outlet and said carriers have third outlets which communicate with the respective chambers and with said at least one second outlet in the second positions of the respective carriers.

7. The apparatus of claim 6, wherein at least one of said third outlets is a slot.

8. The apparatus of claim 6, wherein said filters are disposed between the respective third outlets and the respective second channels.

9. The apparatus of claim 1, wherein said filter means are disposed between said at least one inlet and the respective second and fourth channels in the first positions of the respective carriers.

10. The apparatus of claim 1, wherein at least one of said carriers is a cylinder and the respective chamber, the respective second channel and the respective fourth channel extend substantially radially of said cylinder.

* * * * *